US007889641B2

(12) United States Patent
Liu et al.

(10) Patent No.: US 7,889,641 B2
(45) Date of Patent: Feb. 15, 2011

(54) PATH FLOW FORMULATION FOR FAST REROUTE BYPASS TUNNELS IN MPLS NETWORKS

(75) Inventors: Yu Liu, San Jose, CA (US); Gordon Bolt, Apex, NC (US); Edward Sykes, Cary, NC (US)

(73) Assignee: Opnet Technologies, Inc., Bethesda, MD (US)

( * ) Notice: Subject to any disclaimer, the term of this patent is extended or adjusted under 35 U.S.C. 154(b) by 531 days.

(21) Appl. No.: 11/779,429

(22) Filed: Jul. 18, 2007

(65) Prior Publication Data

US 2008/0019266 A1    Jan. 24, 2008

Related U.S. Application Data

(60) Provisional application No. 60/807,707, filed on Jul. 18, 2006.

(51) Int. Cl.
*G06F 11/00* (2006.01)
(52) U.S. Cl. ...................................................... 370/228
(58) Field of Classification Search ................ 370/216, 370/218, 225, 228, 217, 227, 221; 709/223–226, 709/238–244
See application file for complete search history.

(56) References Cited

U.S. PATENT DOCUMENTS

| | | | | |
|---|---|---|---|---|
| 6,778,492 B2* | 8/2004 | Charny et al. | ............... | 370/228 |
| 6,978,394 B1* | 12/2005 | Charny et al. | .................. | 714/4 |
| 7,012,919 B1* | 3/2006 | So et al. | ....................... | 370/392 |
| 7,230,913 B1* | 6/2007 | Vasseur et al. | ............... | 370/216 |
| 7,398,321 B2* | 7/2008 | Qiao et al. | .................. | 709/239 |
| 7,406,032 B2* | 7/2008 | Li et al. | ....................... | 370/217 |
| 7,693,046 B2* | 4/2010 | Rajagopalan et al. | ....... | 370/216 |
| 7,760,621 B2* | 7/2010 | Xiao et al. | .................. | 370/217 |
| 2003/0126287 A1* | 7/2003 | Charny et al. | ............... | 709/239 |
| 2005/0188100 A1* | 8/2005 | Le Roux et al. | ............. | 709/238 |
| 2006/0146733 A1* | 7/2006 | Alicherry et al. | ............ | 370/255 |
| 2006/0159009 A1* | 7/2006 | Kim et al. | .................... | 370/216 |
| 2006/0187819 A1* | 8/2006 | Bryant et al. | ............... | 370/216 |
| 2007/0036072 A1* | 2/2007 | Raj et al. | ..................... | 370/225 |
| 2007/0140247 A1* | 6/2007 | Ansari | ......................... | 370/392 |

(Continued)

OTHER PUBLICATIONS

Liu, Yu and Bolt, Gordon., "Fast Reroute Deployment Workflows and Design Problem.", OPNET Technical Memo, Feb. 2006, 13 pages.

(Continued)

*Primary Examiner*—Chi H Pham
*Assistant Examiner*—Robert Lopata
(74) *Attorney, Agent, or Firm*—Coats & Bennett, P.L.L.C.

(57) ABSTRACT

A path-flow formulation of defining MPLS FRR bypass LSPs is presented. The path-flow formulation comprises first identifying a set of candidate bypass LSPs, each of which meets various network constraints and has an explicit route around a network facility to be protected. The constraints may include Quality of Service (QoS) guarantees, implementation requirements, network element resource limitations, and resiliency requirements. The constraints may be user-selected, and may be non-linear. The set of candidate bypass LSPs form a linear programming (LP) problem, or an integer linear programming (ILP) problem if the allowable number of bypass LSPs is constrained. In an optimization step, LP solutions are used to select the bypass LSPs from among the candidate bypass LSPs by allocating bandwidth to them.

25 Claims, 4 Drawing Sheets

U.S. PATENT DOCUMENTS

2007/0201375 A1* 8/2007 Hallinan et al. ............. 370/252
2008/0049609 A1* 2/2008 Chao et al. ................. 370/218
2008/0304494 A1* 12/2008 Yokoyama ................. 370/400

OTHER PUBLICATIONS

Liu, Yu., "Reduce Spare Subscribed Bandwidth in FRR Bandwidth Protection.", OPNET Technical Memo, Apr. 2006, 5 pages.

Liu, Yu., "Fast Reroute Optimization Formulation." OPNET Technical Memo, Odan Wiki, Jul. 2006, 3 pages.

Liu, Yu., : Examples in Tighten Node Protection in Fast Reroute Bandwidth Protection. OPNET Technical Memo, Odan Wiki, Jul. 2006, 2 pages.

Liu, Yu., "Fast Reroute Optimization with Accurate Bandwidth Computation." OPNET Technical Memo, Odan Wiki, Jul. 2006, 5 pages.

OPNET Technologies., "MPLS Fast Reroute Design Action Specification: Attributes and Reports." SP Guru Release 12.0, 2006, 30 pages.

Awduche, D. et. al., "Requirements for Traffic Engineering Over MPLS." RFC 2702 on MPLS Traffic Engineering, Internet Engineering Task Force, Sep. 1999, 30 pages.

Ahuja, Ravindra K. et. al., "3.5 Flow Decomposition Algorithms." Network Flows: Theory, Algorithms and Applications. 1993, pp. 79-83, Prentice-Hall, Inc.

* cited by examiner

PATH FLOW FORMULATION FOR FAST REROUTE BYPASS TUNNELS IN MPLS NETWORKS

This application claims priority to U.S. Provisional Application Ser. No. 60/807,707, filed Jul. 18, 2006, and incorporated herein by reference in its entirety.

FIELD OF THE INVENTION

The present invention relates generally to network traffic engineering, and in particular to a path-flow formulation for defining Fast Reroute (FRR) bypass paths in Multi-Protocol Label Switching (MPLS) enabled IP networks.

BACKGROUND

Multi-Protocol Label Switching (MPLS) is a data-carrying mechanism and protocol for packet-switched networks, such as Internet Protocol (IP) networks. MPLS encapsulates IP packets and attaches an MPLS header including a label stack. MPLS-labeled packets are routed through a network along logical Label Switched Paths (LSPs) by performing a Label Lookup/Switch at routing nodes instead of a lookup into the IP table. An LSP is a logical entity that defines a unidirectional traffic flow between two network endpoints, and may include numerous other attributes, such as bandwidth requirements, one or more explicit routes, and the like. When an LSP does not include an explicit route, the actual route of traffic between the endpoints is determined dynamically by Label Switching Routers. Many independent LSPs may be routed through a single network node or link. MPLS supports multiple service models, and provides advantageous traffic management tools.

Fast Reroute (FRR)—also known in the art as MPLS local protection—is a network resiliency mechanism that protects network facilities, such as links and nodes, by defining one or more bypass or backup LSPs to carry traffic around each facility (parallel bypass LSPs protecting the same facility are called a bypass bundle). In the event of a network failure, traffic is directed onto a backup LSP beginning at a Point of Local Repair (PLR), bypassing the failure and merging with the primary LSP at a Merge Point (MP). FRR provides faster recovery than, e.g., recovery mechanisms at the IP layer (which may take several seconds), because the decision of recovery is strictly local. FRR targets to reroute traffic within 50 ms upon failure.

FRR relies on the RSVP traffic engineering (RSVP-TE) protocol, whereby each LSP traversing a link reserves sufficient bandwidth, or link capacity, for its traffic. Link bandwidth not reserved for primary LSPs, referred to herein as spare link capacity or protection bandwidth, is available for FRR and allows bypass LSPs to be routed along the link. Defining bypass LSPs along links having sufficient spare link capacity to carry the traffic of a protected facility, while complying with numerous system constraints to minimize the impact of a failure on MPLS operation, stands as the central problem in FRR design and implementation.

The design of FRR bypass LSPs using an arc-flow formulation is known in the art. In an arc-flow formulation, each link, or network arc, is assigned a decision variable having a binary, integer value (i.e., 0 or 1) indicating whether it is included in a bypass LSP or not. The arc-flow formulation first finds the spare link capacity using a mixed integer linear programming (MILP) model, and then derives routes for the bypass LSPs based on the discovered spare link capacity. This process is computationally complex, and is limited in its ability to accommodate other network constraints in formulating the bypass LSPs.

SUMMARY

In one or more embodiments of the present invention, a path-flow formulation of defining MPLS FRR bypass LSPs is presented. Broadly described, the path-flow formulation comprises first identifying a set of candidate bypass LSPs, each of which meets various network constraints and has an explicit route around a network facility to be protected. The constraints may include Quality of Service (QoS) guarantees, implementation requirements, network element resource limitations, and resiliency requirements. The constraints may be user-selected, and may be non-linear. The set of candidate bypass LSPs form a linear programming (LP) problem, or an integer linear programming (ILP) problem if the allowable number of bypass LSPs is constrained. In an optimization step, LP solutions are used to select the bypass LSPs from among the candidate bypass LSPs by allocating bandwidth to them. In one embodiment, the spare subscribed bandwidth is reduced by sharing spare link subscribed bandwidth on a given link among different bypass bundles, under the assumption of only single-point network failures.

One embodiment relates to a method of defining FRR bypass tunnels on a MPLS network using a path-flow formulation. A network facility to protect is specified. A plurality of candidate bypass Label-Switched Paths (LSP) that satisfy predetermined path and bandwidth constraints and have explicit routes, to carry traffic flows in the event of a failure of a protected facility, are computed. Then, one or more bypass LSPs are selected from among the candidate bypass LSPs by allocating protection bandwidth to the bypass LSPs.

Another embodiment relates to a computer readable medium including one or more computer programs operative to cause a computer to define FRR bypass LSPs for a MPLS network using a path-flow formulation. The computer programs are operative to cause the computer to perform the steps of receiving network topology information; receiving identification of a network facility to protect; receiving predetermined path and bandwidth constraints; computing a plurality of candidate bypass LSPs that satisfy the predetermined path and bandwidth constraints and have explicit routes, to carry traffic flows in the event of a failure of a protected facility; selecting from among the candidate bypass LSPs one or more bypass LSPs by allocating protection bandwidth to the bypass LSPs; and outputting the bypass LSPs.

Yet another embodiment relates to a method of minimizing the link spare subscription of a network link in a MPLS network implementing FRR to protect a node. One or more bypass LSPs are defined to carry traffic around the node in the event of a node failure, the backup LSPs traversing the link. If the link contains at least two bypass LSP and the bypass LSPs share one or more links in the network routes they protect, the aggregate protection bandwidth of the bypass LSPs is reduced such that each bypass LSP protects the bottleneck bandwidth along its protected route and such that the combined bandwidth of each bypass LSP that shares a protected route link is less than or equal to the minimum RSVP bandwidth of the shared link.

DETAILED DESCRIPTION

Figure 1:
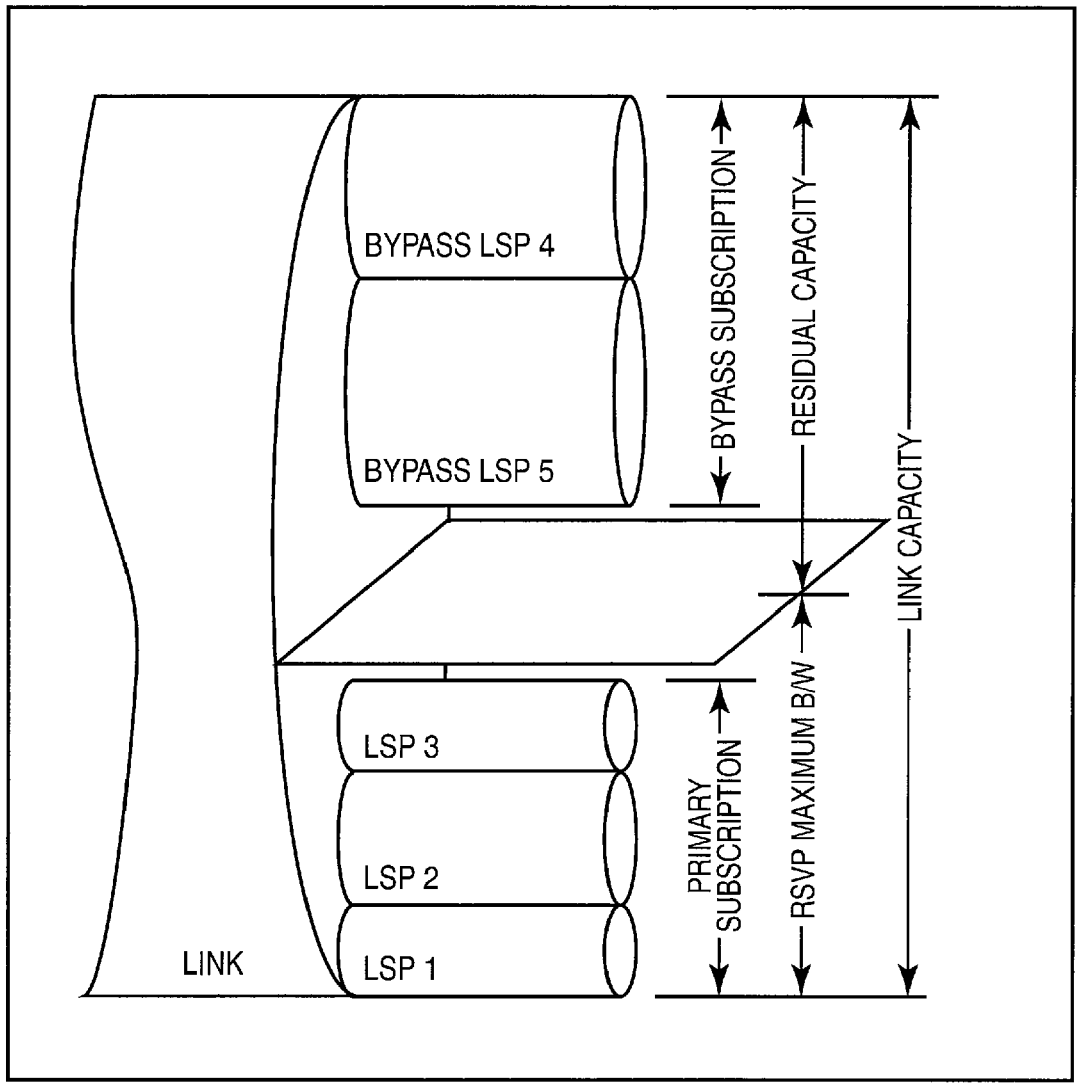
FIG. 1 is a diagram representing bandwidth allocation in a representative MPLS network link.

According to embodiments disclosed and claimed herein, FRR bypass LSPs are defined and optimized using a path-flow formulation. The characterization of network optimization problems as arc-flow or path-flow is defined in Ravindra K. Ahuja, et al., *Network Flows—Theory, Algorithms, and Applications* §3.5 (1993), incorporated herein by reference. In the path-flow formulation, the PLR/MP pairs protecting a network facility are defined and tested against various network constraints to generate a set of candidate bypass LSPs, each of which meets the constraints and has an explicit route. In a subsequent optimization step, formulated as a linear programming (LP) or integer linear programming (ILP) problem, the final bypass LSPs are selected by allocating bandwidth to them.

The path-flow formulation provides the significant advantage that numerous, user-selectable, non-linear network constraints may be applied at the first step—defining the candidate bypass LSPs—making the process more amenable to real-world FRR design problems. Indeed, many of these constraints cannot be accommodated at all in the prior art, arc-flow formulation of the FRR design problem. The two-step, path-flow formulation of first applying constraints and then optimizing the selection of routed LSPs meeting the constraints, is less computationally complex than arc-flow formulations for a given network complexity, providing for a faster solution and enabling iterative formulations considering different network constraints.

Constraints and Optimizations

FRR bypass LSPs defined according to the path-flow formulation of the present invention achieve desired optimization objectives while still maintaining a certain network survivability level and a set of constraints on: Quality of Service (QoS) guarantees of traffic flows; implementation requirements of FRR bypass LSPs; resource limitations of network elements such as links, ports or routers; and resiliency requirements such as the facility to be protected, bandwidth pools to be protected, and shared risk groups to be considered for diversity.

Representative optimization objectives are to minimize the maximum subscription of the link residual bandwidth; to minimize the total subscribed link spare bandwidth; or to maximize the minimum link residual bandwidth.

The facility protection goal can be a perfect survivability level that achieves complete (100%) bandwidth protection. This can be represented as a bandwidth protection constraint in the LP. In the case that 100% bandwidth protection cannot be achieved, the bandwidth protection constraint may be relaxed and used as a part of the objective function to maximize the bandwidth protection percentage.

Constraints that may be applied to the path-flow FRR design include QoS guarantees of the working LSPs, requirements of bypass LSPs, resource limitations on network elements, and resiliency requirements.

QoS guarantees of working LSPs include the hop constraint of the route of each individual LSP, the hop increase constraint of the route of each individual LSP, the delay constraint of the route of each individual LSP, and the delay increase constraint of the route of each individual LSP.

Bypass LSP requirements include the diversity constraint of the route of each bypass LSP to be disjoint of its protected facility, the minimum bandwidth constraint of each bypass LSP, the maximum bandwidth constraint of each bypass LSP, and the maximum number of parallel bypass LSPs that belongs to the same bypass LSP bundle and protect the same facility.

Resource Limitations on network elements include the link spare capacity that could be used for any bypass LSPs (this is frequently the link physical bandwidth minus the RSVP maximum reservable bandwidth), MPLS capability on various routers and interfaces, RSVP capability on various routers and interfaces, IP Routing capabilities on various routers and interfaces, and resource bits colored on each interface of a link for MPLS Traffic Engineering purposes.

Resiliency requirements include the set of facilities to be protected using FRR bypass LSPs (and additionally, which bandwidth pools of the facility to protect), any Shared Risk Group definition that could impact the diversity constraint between the bypass LSPs and their protected facility, and using provided Shared Risk Groups to expand the direct route into a set of taboo links that the bypass LSPs should not use.

In one or more embodiments, existing bypass LSPs are inspected and validated against the same constraints applied in defining the candidate bypass LSPs. Limited maintenance is performed on existing bypass LSPs that violate these constraints. The repaired, existing bypass LSPs then join the set of candidate bypass LSPs in an optimization process that selects the best set of bypass LSPs by allocating bandwidth to them. These steps may be performed in sequence or separately.

Bandwidth Protection

FIG. 1 presents one view of bandwidth allocation in a representative MPLS network link. The link capacity is the physical bandwidth of the link, which may be expressed as, e.g., a data rate. Primary LSPs 1-3 (also known as working LSPs) reserve different amounts of bandwidth for their respective traffic flows via the RSVP mechanism (also known in the art as subscribing bandwidth). The amount of bandwidth actually reserved (subscribed) on a link is the link load. A link RSVP maximum reservable bandwidth, or RSVP maximum, may be defined, setting an upper limit on the link load (when the link load equals the RSVP maximum, the link is said to be fully subscribed). The link residual capacity, also known as the link spare capacity or protection bandwidth, is the link capacity minus the link RSVP maximum reservable bandwidth. Some or all of the residual capacity may be subscribed by bypass LSPs, such as bypass LSPs 4 and 5. This is known as the link spare subscription. An important optimization, considered in greater detail below, is that, under the plausible assumption that only one network facility will fail at a time, different bypass LSPs protecting different facilities may share the link spare subscription on a given link.

The backup bandwidth is the required bandwidth to be subscribed on the link spare subscription along the route of a bypass LSP. The backup bandwidth for a bypass bundle is the sum of the backup bandwidth of the bypass LSPs in the bypass bundle. To achieve full protection, this value should be equal to or larger than the total subscribed bandwidth of the primary LSPs over or through a protected network facility. Without knowledge of the primary LSPs, the required bypass bundle backup bandwidth must be estimated from the bottleneck capacity or link load on the protected route. Accordingly, the decision of backup bandwidth for bypass LSPs is critical to design and deploy FRR bypass LSPs.

Bandwidth protection is an approach to designing and deploying FRR that uses the RSVP maximum reservable bandwidth as the bandwidth to be protected by FRR bypass LSPs. Neither the primary LSP routes nor the link load need be known, since the whole link RSVP bandwidth is protected by the bypass LSPs. The backup bandwidth of a bypass bundle must be estimated by the maximum possible primary subscribed bandwidth along the protected route. A conservative upper bound is the minimum link RSVP bandwidth on the protected route. The bandwidth protection approach thus attempts to protect link RSVP bandwidth without knowing where the primary LSPs are routed. With this approach, the FRR protection is not sensitive to changes in the routing of the working LSPs. This allows the FRR planning timescale to be much greater than the timescale for traffic engineering of the working LSPs.

Figure 2:
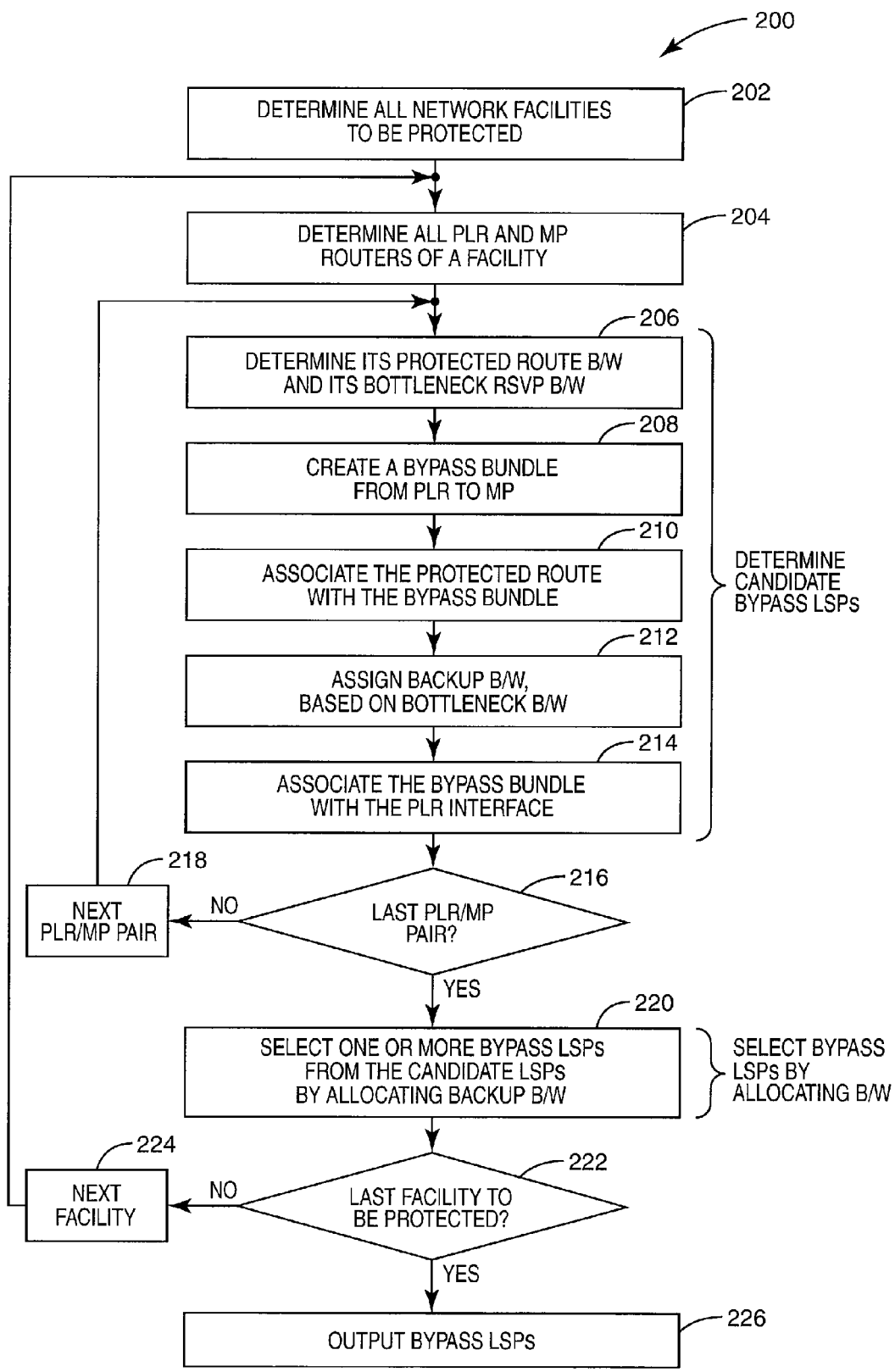
FIG. 2 is a flow diagram of a path-flow method of defining FRR bypass LSPs.

FIG. 2 depicts a method 200 for creating FRR bypass LSPs using a path-flow formulation of the bandwidth protection approach. Based on the assumption that no more than one facility will fail at the same time, the FRR design problem can be partitioned into multiple independent sub-problems, each for a single facility. This significantly simplifies the computational tasks without loss of the solution quality. Accordingly, the first step is to determine all of the network facilities (i.e., links or nodes) to be protected (block 202).

For each network facility to be protected, the routers that may serve as a Point of Local Repair (PLR) and Merge Point (MP) of the facility are determined (block 204). For each PLR/MP pair, its protected route bandwidth and bottleneck RSVP bandwidth are determined (block 206). A bypass bundle comprising one or more candidate bypass LSPs is created from the PLR to the MP, in accordance with a variety of user-supplied network constraints (block 208). The protected route is associated with the bypass bundle (block 210). Backup bandwidth is assigned to the bypass bundle, based on the bottleneck bandwidth above (block 212). The bypass bundle is then associated with the PLR interface (block 214). If another PLR/MP pair exists for the protected facility (block 216), the next PLR/MP pair is selected (block 218), and a new set of candidate bypass LSPs are defined (blocks 206-214).

When all candidate bypass LSPs for a given facility have been defined (i.e., there are no remaining PLR/MP pairs for the facility) (block 216), the actual bypass LSPs are determined by allocating backup bandwidth on the residual network of the facility (block 220). That is, a candidate bypass LSP that is allocated bandwidth is a valid bypass LSP; a candidate bypass LSP that is allocated no bandwidth is effectively not selected as a valid bypass LSP. This optimization requires solving a multi-commodity flow problem, which may be characterized as a linear programming (LP) problem. If the number of bypass LSPs is constrained to a specific integer value, the problem may be characterized as an integer linear programming (ILP) problem. A variety of tools for solving LP/ILP programs are known in the art, for example, the open-source software package lp_solve.

Note that blocks 206-214 in FIG. 2, iterated over all PLR/MP pairs for a facility, together specify the initial path-flow formulation step of determining a set of candidate bypass LSPs for a given network facility to be protected. Block 220 specifies a subsequent path-flow formulation step of selecting one or more of the candidate bypass LSPs to serve as actual bypass LSPs by allocating bandwidth to them. This path-flow formulation of the FRR design problem differs significantly from the arc-flow formulations of the prior art.

As discussed above, the total bandwidth of the bypass LSPs for a protected facility is at least the bottleneck RSVP bandwidth of their protected route. Multiple bypass LSPs can provide load-balancing. However, they also introduce a packing problem: the primary LSPs need to decide which bypass LSP they should select. This packing problem is not considered in the planning of bypass LSPs, but rather is an operational problem solved inline by Label Switched Routers at the time of a failure.

Path-Flow Formulation

The following notation is used to present a representative embodiment of path-flow formulation of the bandwidth protection approach to FRR design:

The network is represented by a directed graph G(N,E).

A node $i \in N$ denotes a router and an arc $l=(i,j) \in E$ denotes one direction of a link, where i and j are the head-end and tail-end router, respectively.

The link capacity is $u_l$. The RSVP maximum reservable bandwidth is $c_l$. The residual capacity is $r_l = u_l - c_l$.

A set of facility F are given. The element $f \in F$ can be either a link $l \in E$ or a node $i \in N$. Since the problem can be partitioned for individual facilities, index f is omitted in the formulations without any confusion.

A link facility has two end routers and two bypass bundles. Each bypass bundle protects one direction of the link. A node facility has multiple adjacent routers as its PLRs and MPs. They can construct a set of full meshed bypass bundles.

The number of the adjacent routers d for a link facility is 2. For a node facility, d is equal to the degree of this node.

The set of protected routes is K with its size $|K|=d*(d-1)$.

Each protected route is indicated by $p_l^k$:1 means link l is used in the protected route, 0 otherwise.

For a protected route k, its protected subscription is $b_k$. In the bandwidth protection approach, this value is not known. However, the bottleneck RSVP bandwidth $b^*_k$ can be pre-calculated and substituted for $b_k$.

The bypass bundles are indexed by the same k used in their protected routes. The one-to-one relationship between a bypass bundle and its protected route avoids any confusion.

A bypass bundle k has one or more bypass LSPs to protect the bottleneck RSVP bandwidth $b_k$.

The link residual capacity subscribed by bypass bundles is $s_l, l \in E, 0 \leq s_l \leq r_l$.

On edge $l=(i,j) \in E$, the bypass bundle k subscribes a bandwidth of $x_l^k = x_{(i,j)}^k, x_l^k \geq 0$.

For a protected route $k, k \in K$ the links $l, l \in E$ used by this direct route are denoted as $p_{kl}=1$, while the links not used by it have $p_{kl}=0$.

A set of Shared Risk Groups (SRGs) is R; whether the group $r \in R$ contains link l is indicated by $g_{rl}=1$, or $g_{rl}=0$ otherwise. A bypass LSP should not use any taboo links that belong to any SRGs that influence its protected route.

A set of taboo links is indicated by $t_{kl}$ where $t_{kl}=1$ for any taboo link l, and $t_{kl}=0$ otherwise. Equation (1) is used to precompute $t_{kl}$ where the summation operation uses the binary operator 1+1=1, rather than decimal addition:

$$t_{kl} = \sum_{r \in R} g_{rl} \sum_{j \in E} (g_{rj} p_{kj}), \forall l \in E, \forall k \in K \qquad (1)$$

Let M be an arbitrary large number that is bigger than the maximum link capacity. For a bypass bundle k, let o(k) and d(k) be its PLR and MP routers.

The path-flow formulation uses decision variables to choose a solution out of a set of pre-computed paths (i.e., candidate LSPs that meet predetermined constraints and have explicit routes).

Let $Q_k$ be the number of candidate paths for a bypass bundle k.

Let $\delta_{ql}^k$ equal to 1 if the q-th path in the candidate path set of bypass bundles k uses link l, or 0 otherwise.

Let $z_p^k$ be the subscribed bandwidth on the q-th path of bypass bundle k. This is the decision variable in the LP or ILP problem formulation. By allocating bandwidth to selected ones of the candidate bypass LSPs, the optimization phase (LP/ILP problem solution) effectively selects bypass LSPs from among the candidate bypass LSPs. That is, a candidate bypass LSP allocated no bandwidth is not selected and will not be a bypass LSP.

The optimization formulation is:

$$\min \sum_{l \in L} s_l \quad (2)$$

$$\text{s.t.} \quad s_l \leq \alpha r_l, \forall l \in E \quad (3)$$

The objective (2) minimizes with a total link spare subscription. The constraint (3) limits the total spare subscription below a preset subscription value α on the link residual capacity.

$$s_l = \sum_{k=1}^{K} \sum_{q=1}^{Q} \delta_{ql}^k z_q^k, \forall l \in E \quad (4)$$

The constraint (4) computes the aggregated link spare subscription from its contained bypass LSPs. However, for the node protection approach this is a conservative upper bound. A tighter bound on the aggregated link spare subscription in the node protection case is computed through a more complex set of equations described later.

$$\sum_{q=1}^{Q} z_q^k = b_k, \forall k, 1 \leq k \leq K \quad (5)$$

The constraint (5) limits the total subscription carried on all candidate LSPs of the bypass bundle that satisfied the requirements. This constraint is relaxed when providing 100% protection is infeasible (i.e., the = becomes <= and the objective function is altered to maximize the bandwidth protection percentage).

$$z_q^k \geq 0, \forall q, 1 \leq q \leq Q_k, \forall k, 1 \leq k \leq K \quad (6)$$

The bound (6) specifies that each candidate LSP carries non-negative flow.

The hop and delay constraints have been captured by filtering the candidate LSPs in the path formulation. This simplifies the math programming model significantly, as compared to prior art arc-flow formulations, in which these constraints are much more difficult to model.

MPLS router implementation includes a parameter defining a maximum number of bypass LSPs, which is used to limit the number of parallel bypass LSPs protecting the same route. Considering this parameter in the FRR design problem will change the above linear programming (LP) formulation into an integer LP (ILP) problem. This is a non-deterministic polynomial (NP) problem.

Let variable $y_{pl}^k$ equal 1 if the p-th candidate LSP of the bypass bundle k is used in the solution, or 0 otherwise. Let $p^{max}$ denote the maximum number of bypass LSPs allowed. The extra formulation to consider this constraint is:

$$z_p^k \leq M y_p^k, \forall p, 1 \leq p \leq Q^k, \forall k, 1 \leq k \leq K \quad (7)$$

$$\sum_{p=1}^{Q^k} y_p^k \leq p^{max}, \forall k, 1 \leq k \leq K \quad (8)$$

$$y_p^k = 0 \text{ or } 1 \quad (9)$$

The path-flow formulation first computes a set of candidate bypass LSPs, and then creates a linear programming model, which may be solved using existing tools such as lp_solve. However, when the integer constraints (7) to (9) are considered in the model, the path formulation becomes a large scale Integer Linear Program (ILP) problem. It has a large number of columns, each one for a decision variable. Column generation is a known algorithm to solve such path-flow formulations of the multicommodity flow problem.

Reducing Spare Subscribed Bandwidth

Figure 3:
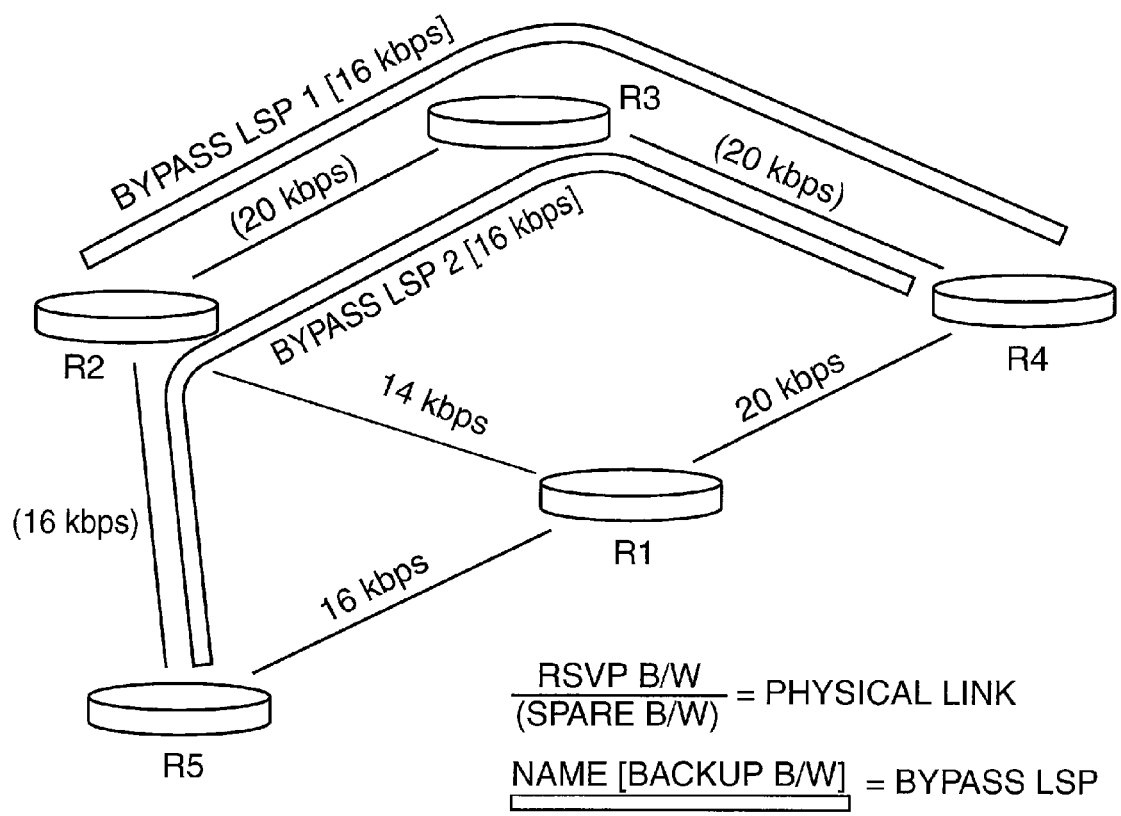
FIG. 3 is a network diagram.

As noted above for node protection, the spare link subscribed bandwidth value of a given link is not simply the aggregated backup bandwidth of its contained bypass LSPs. Since the backup bandwidth of bypass LSPs is an estimated upper bound of the actual RSVP load over the protected routes, the link spare subscribed bandwidth could be reduced when multiple bypass LSPs are routed over a link when they also have overlapped links on the protected route(s). A simple example is given in FIG. 3. It is not very difficult to compute that the spare subscribed bandwidth on link R2-R3, $s_{23}$=20 kbps, not 30. However, if there are more than two bypass LSPs for a node facility FRR problem, the computation of spare subscribed bandwidth becomes very complicated.

Figure 4:
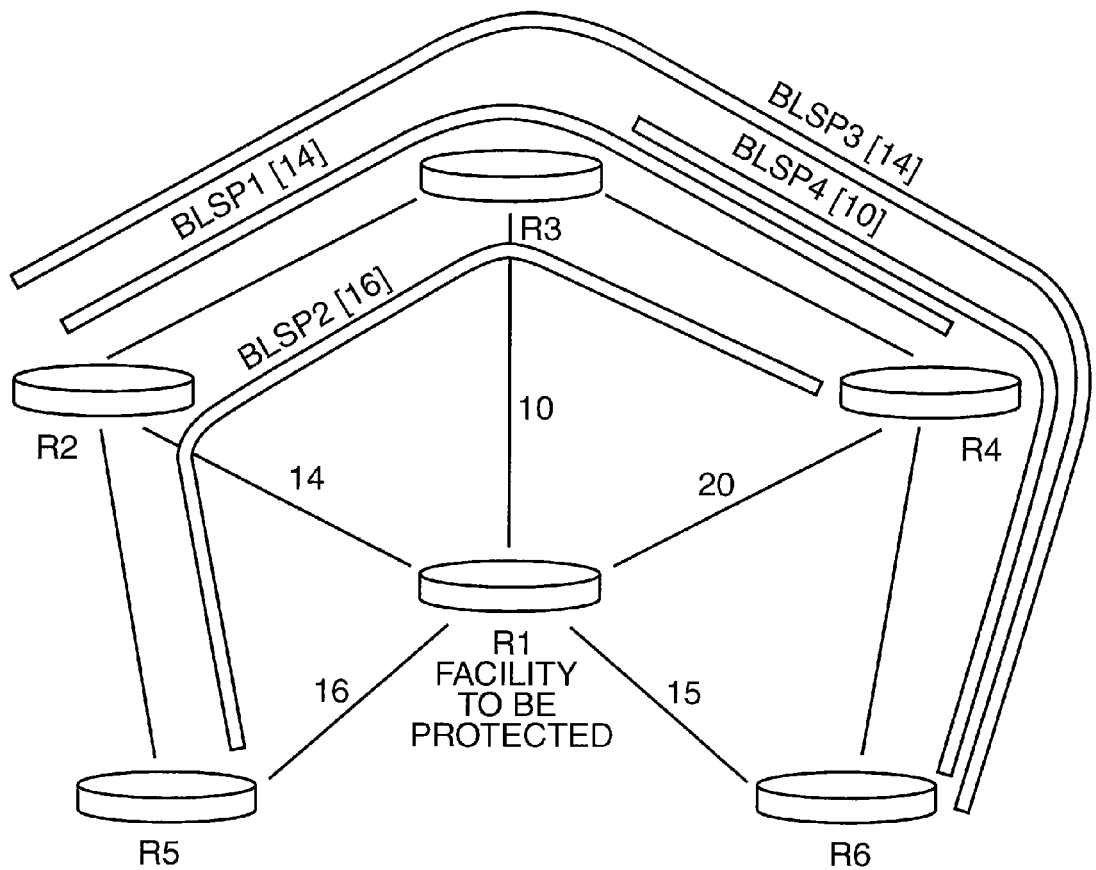
FIG. 4 is a network diagram demonstrating shared link spare subscribed bandwidth.

A more complicated example is presented in FIG. 4, in which the protected network facility is node R1. The routes of four bypass LSPs and their associated protected routes are presented in Table 1, where each column represents a link (between the numbered nodes), and each row represents a bypass LSP. A value of 1 in the table means the route of bypass LSP of that row (or its protected route) will use the link of that column. All links ending at R1 (i.e., the first five columns) will only be used by the protected routes. The links in the last four columns carry the bypass LSPs. The last row shows the link spare subscribed bandwidth $s_l$.

TABLE 1

Link Usage of Bypass LSPs and the Routes They Protect

|  | 1-2 | 1-3 | 1-4 | 1-5 | 1-6 | 2-3 | 2-5 | 3-4 | 4-6 |
|---|---|---|---|---|---|---|---|---|---|
| bLSP1 | 1 |  | 1 |  |  | 1 |  | 1 |  |
| bLSP2 |  | 1 |  | 1 |  | 1 | 1 | 1 |  |
| bLSP3 | 1 |  |  |  | 1 | 1 |  | 1 | 1 |
| bLSP4 |  | 1 |  |  | 1 |  |  | 1 | 1 |
| $S_l$ |  |  |  |  |  | 30 | 16 | 35 | 15 |

Let $d_k$ be the possible carried bandwidth on bypass LSP k, k=1, . . . , 4. The upper bound of this value is the minimum link RSVP bandwidth on the protected route of this bypass LSP. We call this bottleneck bandwidth. The value in $d_k$ can be a value smaller than this bottleneck bandwidth under certain situations, such as the one described below.

Let $r_l=r_{ij}$ be the RSVP bandwidth of link $l,l=(i, j) \in E$. Let $s_l=s_{ij}$ be the subscribed spare bandwidth on link $l,l=(i, j) \in E$. To find the spare subscribed bandwidth on link R2-R3, the following steps are performed:

1. Collect the bypass LSPs traversing link R2-R3, i.e., bLSP1, bLSP2, and bLSP3.

2. The spare link load on link R2-R3 is the largest possible value of the total backup bandwidth of its contained bypass LSPs:

$$s_{23}=\max(d_1+d_2+d_3) \quad (10)$$

3. Checking these three bypass LSPs in Table 1 for their overlapped links on their protected routes, the following constraints can be found on columns "1-2" and "1-4":

$$s.t. d_1+d_3 \leq r_{12}=14 \quad (11)$$

$$d_1+d_2 \leq r_{14}=20 \quad (12)$$

4. Meanwhile, each bypass LSP should protect the bottleneck bandwidth along its protected route:

$$0 \leq d_1 \leq \min(r_{12},r_{14})=14 \quad (13)$$

$$0 \leq d_2 \leq \min(r_{15},r_{14})=16 \quad (14)$$

$$0 \leq d_3 \leq \min(r_{12},r_{16})=14 \quad (15)$$

These constraints ensure that the spare subscribed bandwidth value in (10) is smaller than the simple accumulated approach, where the backup bandwidth is fixed conservatively at its upper bound—the bottleneck RSVP bandwidth along its protected route:

$$d_k=\min(r_{ij}, \forall (i,j) \in \text{protected route of bypass LSP } k)$$

This formulation is a linear programming problem with the objective function as (10) and constraints (11)-(15). The solution can be found by solving this problem by hand: $s_{23}=30$ when the optimal solutions $(d_1, d_2, d_3)$ are located on a line between (0, 16, 14) and (4, 16, 10).

For link R3-R4, using similar steps as just described, the following LP problem is derived:

$$s_{34}=\max(d_1+d_2+d_3+d_4) \quad (16)$$

$$s.t. d_1+d_3 \leq r_{12}=14 \quad (17)$$

$$d_1+d_2 \leq r_{14}=20 \quad (18)$$

$$d_3+d_4 \leq r_{16}=15 \quad (19)$$

$$0 \leq d_1 \leq \min(r_{12},r_{14})=14 \quad (20)$$

$$0 \leq d_2 \leq \min(r_{15},r_{14})=16 \quad (21)$$

$$0 \leq d_3 \leq \min(r_{12},r_{16})=14 \quad (22)$$

$$0 \leq d_4 \leq \min(r_{13},r_{16})=10 \quad (23)$$

The optimal solution is $s_{34}=35$, when $(d_1, d_2, d_3, d_4)=(4, 16, 10, 5)$.

General LP Formulation to Reduce Spare Link Subscribed Bandwidth

In the above two examples, we assume bypass LSPs' routes are known. The required spare link subscribed bandwidth $s_l$ on link l must be computed. Next, we formulate the problem using a more abstract math programming model so that it can be incorporated into the FRR design model. We define the following notations:

Let $\Theta$ denote the protected route-to-link incidence matrix. Its element $\theta_{kl}$ is 1 if the protected route of bypass LSP k traverses link l, and 0 otherwise. An example of this matrix is the first five columns of Table 1 above.

Let $\Delta$ denote the bypass LSP route-to-link incidence matrix. Its element $\delta_{kl}$ is 1 if bypass LSP k traverses link l, and 0 otherwise. An example of this matrix is the last four columns of Table 1 above.

Let the column vector $d^l$ contain elements of the maximum possible backup bandwidth $d_k^l$ on bypass LSP $k, 1 \leq k \leq K$ when these bandwidths contribute to the maximum spare capacity $s_l$ on link l.

Let the column vector r contain elements of the RSVP bandwidth $r_l$ on link l, where $l=(i,j) \in E$ or $1 \leq l \leq L, L=|E|$.

Let the column vector s contain elements of the spare subscribed bandwidth $s_l$ on the link l, $1 \leq l \leq L$.

For a given link l, the formulation to find spare capacity $s_l$ is:

$$\max_{d^l} s_l \quad (24)$$

$$\text{subject to: } s_l = \sum_{k=1}^{K} \delta_{kl} d_k^l \quad (25)$$

The objective (24) is to minimize the spare subscribed bandwidth on link l. The design variables are the possible carried bandwidth $\delta_{kl}$ on bypass LSP k for link l. The equation (25) computes the link spare subscribed bandwidth by taking the maximum value of accumulated bandwidth of all backup LSPs that traverse this link. Equations (24) and (25) generalize equations (10) and (16), respectively, in the previous examples.

$$\sum_{k=1}^{K} \theta_{kl} d_k^l \leq r_j, \forall j, 1 \leq j \leq L \quad (26)$$

The constraint (26) applies to any set of bypass LSPs whose protected routes traverse the link j. The total carried backup bandwidth of these bypass LSPs, computed on the left-hand side, does not exceed the link RSVP bandwidth, $r_j$, on the right-hand side. This constraint generalizes (11)-(12) and (17)-(19) in the previous examples.

$$\theta_{kj}(d_k^l - r_j) \leq 0, \forall k, 1 \leq k \leq K, \forall j, 1 \leq j \leq E \quad (27)$$

$$\Leftrightarrow \theta_{kj} d_k^l \leq \theta_{kj} r_j \quad (28)$$

$$\leq r_j, \forall k, 1 \leq k \leq K, \forall j, 1 \leq j \leq E \quad (29)$$

$$\Leftarrow \quad (26)$$

The constraint (27) requires that the backup bandwidth of a bypass LSP does not exceed the bottleneck RSVP bandwidth on its protected route. This constraint generalizes (13)-(15) and (20)-(23) in the previous examples. This constraint is not included in the model because it is weaker than the earlier constraint (26).

This model can be used to inspect existing bypass LSPs and their protected routes to evaluate whether they satisfy the bandwidth protection requirements, and hence may join the candidate bypass LSPs in the path-flow formulation FRR solution. During the optimization phase of the path-flow formulation (i.e., selecting bypass LSPs by allocating bandwidth to them), constraints (25)-(26) must be incorporated. The design variable $d_k^l$ is partitioned by $x_{kp}^l$ for each candidate path p of the protected route k. The variable $x_{kq}^l$ is not only for a candidate path p of protected route k, but also for a link l whose spare subscribed bandwidth $s_l$ must be determined.

The path-flow formulation of the design of bypass LSPs for FRR in a MPLS network discussed herein may be implemented by discrete calculations, by specialized software executing on a general-purpose computer or dedicated network monitoring/optimization workstation, or by any combination of software, dedicated hardware, firmware, or the like, as known in the computing arts. In one exemplary embodiment, the design and optimization of bypass LSPs for FRR is implemented as part of a network analysis and optimization software program, such as the OPNET SP Guru Release 12.0, available from OPNET Technologies, Inc.

Input to such a software program—network topology, network facility capabilities, facilities to be protected, network constraints to apply to bypass bundles, and the like—may be obtained by the program in a variety of ways, as known in the programming arts. For example, network topology may be read from a file or obtained by an analysis of an actual network, as represented in any known form. Facilities to be protected and constraints to apply to the path-flow FRR formulation may be obtained interactively from a user, such as via user-selectable options in a user interface element such as a window. FRR bypass bundles generated may be output as graphs, listings of network elements, or in any other format, as known in the art.

As used herein, a "candidate bypass LSP" is an MPLS Label-Switched Path between a PLR and MP of a network facility to be protected, that meets all applied network constraints and additionally has an explicit route defined from the PLR to the MP. As used herein, a "bypass LSP" is an LSP selected from among the set of candidate bypass LSPs by allocating bandwidth to the bypass LSP. Two or more parallel backup LSPs that protect the same facility form a "bypass bundle."

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of defining Fast Reroute (FRR) bypass tunnels on a Multi-Protocol Label Switching (MPLS) network using a path-flow formulation, comprising:
    specifying a network facility to protect;
    computing, using a path-flow formulation, a plurality of candidate bypass Label-Switched Paths (LSP) that protect one or more routes through the facility, satisfy predetermined path and bandwidth constraints, and have explicit routes, to carry traffic flows in the event of a failure of the protected facility; and
    selecting from among the candidate bypass LSPs one or more bypass LSPs by allocating protection bandwidth to the bypass LSPs.

2. The method of claim 1 wherein selecting from among the candidate bypass LSPs one or more bypass LSPs by allocating protection bandwidth to the bypass LSPs comprises formulating and solving a linear programming (LP) problem on the set of candidate bypass LSPs with the protection bandwidth to be allocated to the bypass LSPs being a decision variable.

3. The method of claim 2 wherein selecting bypass LSPs by allocating bandwidth to them further comprises specifying an integer maximum number of bypass LSPs for a protected facility, and formulating and solving an integer linear programming (ILP) problem on the candidate bypass LSPs.

4. The method of claim 1 further comprising:
    inspecting previously defined bypass LSPs protecting the selected facilities by applying the predetermined path and bandwidth constraints to the existing bypass LSPs;
    repairing the existing bypass LSPs to conform to the predetermined path and bandwidth constraints; and
    adding the repaired, existing bypass LSPs to the plurality of candidate bypass LSPs prior to selecting bypass LSPs from among the candidate bypass LSPs.

5. The method of claim 1 wherein computing a plurality of candidate bypass LSPs comprises:
    determining all Point of Local Repair (PLR) and Merge Point (MP) routers of the facility to be protected; and for each PLR/MP pair,
    determining the protected route bandwidth and the bottleneck RSVP bandwidth;
    creating a bypass bundle from the PLR to the MP;
    associating the protected route with the bypass bundle;
    assigning backup bandwidth, based on the bottleneck RSVP bandwidth; and
    associating the bypass bundle with the PLR interface.

6. The method of claim 1 wherein the predetermined path constraints include a maximum number of hops.

7. The method of claim 1 wherein the predetermined path constraints include a maximum increase in the number of hops.

8. The method of claim 1 wherein the predetermined path constraints include a maximum delay.

9. The method of claim 1 wherein the predetermined path constraints include a maximum delay increase.

10. The method of claim 1 wherein the predetermined path constraints include a diversity constraint that each bypass LSP be disjoint of the facility it protects.

11. The method of claim 10 wherein the predetermined path constraints include constraints derived from a shared risk group definition that could impact the diversity constraint between the bypass LSPs and the protected facility.

12. The method of claim 1 wherein the predetermined path constraints include a minimum bandwidth for each bypass LSP.

13. The method of claim 1 wherein the predetermined path constraints include a limit on the number of parallel bypass LSPs that protect the same facility.

14. The method of claim 1 wherein the predetermined path constraints include taboo links that may not be used in bypass LSPs.

15. The method of claim 1 wherein the predetermined path constraints include constraints derived from the MPLS capability on network facilities.

16. The method of claim 1 wherein the predetermined path constraints include constraints derived from the RSVP capability on network facilities.

17. The method of claim 1 wherein the predetermined path constraints include constraints derived from the IP routing capability on network facilities.

18. The method of claim 1 wherein the predetermined path constraints include constraints derived from resource bits colored on each interface of a link for MPLS traffic engineering purposes.

19. The method of claim 1 wherein one predetermined bandwidth constraint is the bandwidth pool of the facility to be protected.

20. The method of claim 1 wherein allocating protection bandwidth to the bypass LSPs comprising allocating to a first bypass LSP on a given link, less bandwidth than the RSVP maximum of the corresponding protected route if a second bypass LSP also traversing the link shares a link on the protected route with the first bypass LSP.

21. A non-transitory computer readable medium including one or more computer programs operative to cause a computer to define Fast Reroute (FRR) bypass Label-Switched Paths (LSP) for a Multi-Protocol Label Switching (MPLS) network using a path-flow formulation, the computer programs operative to cause the computer to perform the steps of:
 receiving network topology information;
 receiving identification of a network facility to protect;
 receiving predetermined path and bandwidth constraints;
 computing, using a path-flow formulation, a plurality of candidate bypass LSPs that protect one or more routes through the facility, satisfy the predetermined path and bandwidth constraints, and have explicit routes, to carry traffic flows in the event of a failure of the protected facility;
 selecting from among the candidate bypass LSPs one or more bypass LSPs by allocating protection bandwidth to the bypass LSPs; and
 outputting the bypass LSPs.

22. The computer readable medium of claim 21 wherein the computer programs are further operative to cause the computer to perform the steps of:
 receiving identification of previously defined bypass LSPs protecting the selected facilities;
 inspecting the existing bypass LSPs by applying the predetermined path and bandwidth constraints to the existing bypass LSPs;
 repairing the existing bypass LSPs to conform to the predetermined path and bandwidth constraints; and
 adding the repaired, existing bypass LSPs to the plurality of candidate bypass LSPs prior to selecting bypass LSPs from among the candidate bypass LSPs.

23. The computer readable medium of claim 21 wherein computing a plurality of candidate bypass LSPs that satisfy the predetermined path and bandwidth constraints comprises:
 determining all Point of Local Repair (PLR) and Merge Point (MP) routers of the facility to be protected; and
 for each PLR/MP pair,
  determining the protected route bandwidth and the bottleneck RSVP bandwidth;
  creating a bypass bundle from the PLR to the MP;
  associating the protected route with the bypass bundle;
  assigning backup bandwidth, based on the bottleneck RSVP bandwidth; and
  associating the bypass bundle with the PLR interface.

24. The method of claim 1 wherein two or more of the bypass LSPs share one or more links in the network routes they protect, reducing the aggregate protection bandwidth of the bypass LSPs such that each bypass LSP protects a bottleneck bandwidth along its protected route and such that the combined bandwidth of each bypass LSP that shares a protected route link is less than or equal to the minimum RSVP bandwidth of the shared link.

25. The method of claim 24 wherein reducing the aggregate protection bandwidth of the bypass LSPs comprises formulating and solving a linear programming problem with an objective function that the spare link load is the largest possible value of the total backup bandwidth of its contained bypass LSPs, subject to the constraints:
 the sum of protection bandwidths of each bypass LSP that shares a protected route link is less than or equal to the minimum RSVP bandwidth of the shared protected route link; and
 each bypass LSP has at least the bandwidth of the minimum RSVP bandwidth of any link in its protected route.

* * * * *